United States Patent Office 2,991,388
Patented July 4, 1961

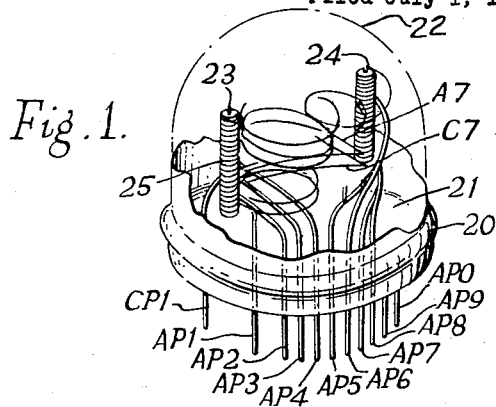
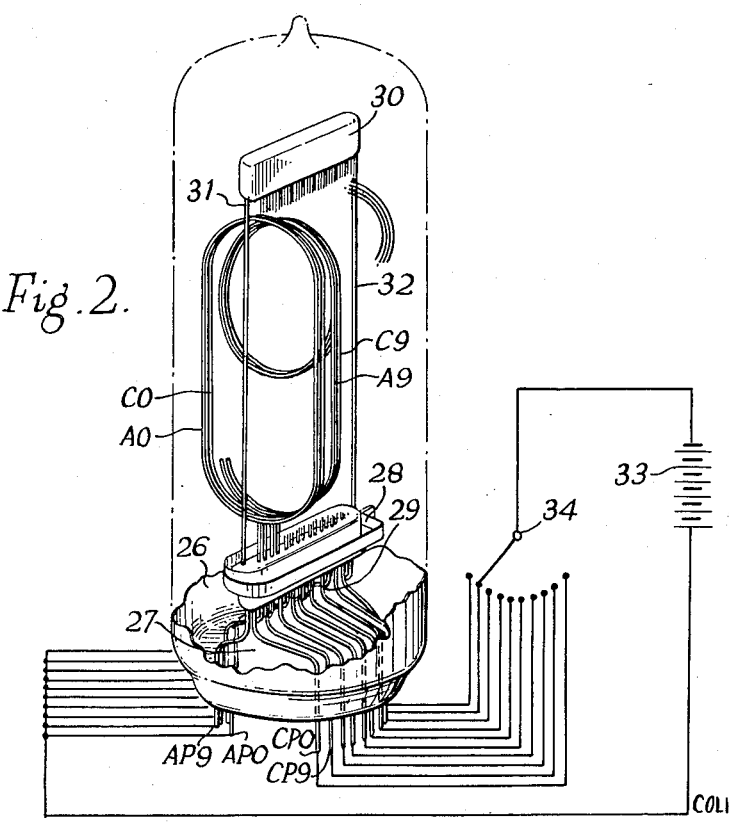

2,991,388
DISPLAY DEVICES EMPLOYING GLOW
DISCHARGE TUBES
Colin J. Wightman, Beeston, Nottingham, England, assignor to Ericsson Telephone Limited, London, England
Filed July 1, 1959, Ser. No. 824,283
Claims priority, application Great Britain July 2, 1958
12 Claims. (Cl. 313—109.5)

The present invention relates to display devices employing glow discharge tubes of the type comprising a gas-filled envelope within which there is disposed a plurality of display electrodes of different shapes such as, for example, numerals, letters, plus signs, minus signs, and so on, to be illuminated, the electrodes being connected to separate terminal pins extending through the base of the envelope, and the arrangement being such that, in operation, with a selected one of the display electrodes functioning as a cathode and another electrode in the tube as an anode a glow discharge takes place having the shape of the selected display electrode.

According to the present invention a display device comprises a glow discharge tube of the type specified and having two interleaved sets of display electrodes, the electrodes of the two sets alternating, a common potential source to which all the electrodes of one set are connected to form an anode, and circuit means for selectively biasing the electrodes of the other set to create a glow discharge in which a selected electrode acts as a cathode.

In accordance with the invention a glow discharge tube of the type specified for use in such a display device has two interleaved sets of electrodes, the electrodes of one set being substantially identical with those of the other set, and the electrodes are arranged with like electrodes of the two sets adjacent to one another, the electrodes of one set alternating with those of the other. In this way each cathode formed by an electrode of one set has an immediately adjacent anode of corresponding form and a large part of the discharge takes place between the adjacent cathode and anode.

Any electrodes of the cathode set not required for display purposes may be connected to the electrodes of the anode set.

Specific embodiments of the invention will now be described, by way of example, with reference to the accompanying drawings, in which FIG. 1 is a perspective view of a glow discharge tube according to the invention with parts cut away for greater clarity, and FIG. 2 shows in cut-away perspective a second form of glow discharge tube in accordance with the invention connected in the circuit, shown schematically and in simplified form, of a display device in accordance with the invention.

The glow discharge tube shown in FIG. 1 has a glass envelope 20 of hemispherical form with a flat circular base 21 and a domed upper transparent wall portion indicated by the chain-dotted line 22. Support posts 23 and 24 extend upwards from the base 21 of the envelope and each carry a plurality of insulating spacers 25.

Twenty electrodes in two sets of ten, each consisting of electrodes in the form of the numerals 1 to 9 and 0, are mounted between the posts 23 and 24, spaced from one another and in planes parallel to the base 21 of the envelope and facing the transparent viewing wall 22. The electrodes A1, A2, . . . A9, A0 of one set are interleaved with the electrodes C1, C2, . . . C9, C0 of the other set so that like electrodes of the two sets are adjacent to each other, the electrodes of one set alternating with those of the other set. The electrodes are of fine or thin electrically conducting material and are arranged generally in planes parallel to each other. The electrodes of each pair of like electrodes represent a unique character differing from the character of each of the other pairs of like electrodes. Moreover, since the like electrodes of each pair are substantially identical to each other, and supported directly in the stacked array of electrodes, all of the portions of one character of a pair are generally uniformly spaced from the corresponding like portions of the other character of the same pair of electrodes. The pairs of like electrodes need not be in numerical order and will be arranged to minimise interference in the discharge between a pair of adjacent electrodes by neighbouring electrodes and consequent masking of the numeral displayed. The electrodes may, for example, be arranged in the following order C5, A5, C3, A3, C8, A8, C9, A9, C7, A7, C2, A2, C4, A4, C1, A1, C0, A0, C6, A6.

Each of the electrodes is connected to a respective terminal pin projecting through the base 21, the terminal pins being arranged in two sets CP1—CP0 and AP1—AP0, as shown, and connected to the electrodes C1—C0 and A1—A0, respectively. Thus the ten pins of each set can either be connected together to a common potential source to enable the corresponding electrodes to act as anodes or else be connected to a selector circuit for biasing any one of the corresponding electrodes to act as a cathode. Also, some or at least one of the electrodes of the set in which one of the electrodes acts as a cathode may be connected by any suitable circuit means to act as anodes together with electrodes of the other set. Moreover the two sets of electrodes with their corresponding sets of terminal pins are interchangeable, which makes it possible to prolong the life of the tube by using one set of electrodes as cathodes until they become inactive and then reversing the connections and employing the other set of electrodes as cathodes.

In FIG. 2 is shown an alternative form of glow discharge tube in accordance with the invention. In this embodiment the glass envelope 26 is cylindrical, its upper part being indicated in broken lines, and the electrodes C1—C0 and A1—A0 are arranged in planes parallel to the longitudinal axis of the cylinder and perpendicular to the base 27 forming one end of the cylinder. The electrodes are supported between an insulating support 28, through which pass leads 29 connecting the electrodes to their respective terminal pins, and an insulating bar 30 spaced from the support 28 by rods 31 and 32.

The cylindrical envelope with the electrodes mounted parallel to its principal axis offers certain advantages over the hemispherical envelope in that the edges of the electrodes are generally closer to the wall of the envelope and thus an envelope of smaller dimensions in the plane of the electrodes can be used for the same size of electrode. This is particularly advantageous when the tubes are to be arranged side by side in a row.

The terminal pins AP1—AP0 are, as shown, connected by a common lead to a source of potential represented by the battery 33. As the electrodes AP1—AP0 are to serve as anodes, they are connected to the positive terminal of the battery 33, while the negative terminal is connected through a selector switch 34 to one of the other set of electrodes C1—C0. Each of the terminal pins CP1—CP0 is connected to a separate contact of the selector switch 34 whereby any one of the electrodes C1—C0 can be selected and biased negatively to initiate a discharge in which it serves as the cathode. It will be clear that the tube of FIG. 1 could replace that of FIG. 2 in such a circuit to form a display device of the same type.

In the illustrated embodiments of the invention, it is apparent that each set of electrodes C1—C0 and A1—A0, respectively, is a complete group of electrodes including all the different display characters required for a particular system of visual expression of intelligence, such as the ten digits required for a visual indication in a decimal system of counting.

In other embodiments of the invention, not illustrated in the drawing, the electrodes of one set have shapes different from those of the other. Thus when the connections are reversed a new set of electrode shapes are made available for carrying out a sequence of operations differing from that carried out with the first set of electrodes as cathodes. This type of structure is particularly suitable for the provision of animated figures.

I claim:

1. A display device comprising a glow discharge tube of the type specified and having two interleaved sets of display electrodes, the electrodes of the two sets alternating, each of said display electrodes being a complete group of electrodes representing all the different display characters required for a particular system of visual expression of intelligence, a common potential source to which all the electrodes of one set are connected to form an anode, and circuit means for selectively biasing the electrodes of the other set to create a glow discharge in which a selected electrode acts as a cathode, said circuit means further including switch means so connected as to be able to reverse the connections of the electrodes of the two sets whereby said other set becomes the anode and the electrodes of said one set may be selectively biased to act as cathodes.

2. A display device according to claim 1, wherein said circuit means includes means for connecting at least some of the electrodes of both said sets to act as anodes while a further one of said electrodes is connected to act as a cathode.

3. A glow discharge tube of the type specified having two interleaved sets of character electrodes, the electrodes of one set being substantially identical with those of the other set, and in which the electrodes are arranged with like electrodes of the two sets adjacent to one another, the electrodes of one set alternating with those of the other.

4. A display device including a glow discharge tube, the tube comprising a gas-filled envelop, a first set of display electrodes mounted within the envelope, a second set of display electrodes interleaved with those of said first set, the electrodes of the two sets alternating, each of said display electrodes being a complete group of electrodes representing all the different display characters required for a particular system of visual expression of intelligence, a first group of terminal pins sealed through the envelope and connected to respective electrodes of said first set, and a second group of terminal pins sealed through the envelope and connected to respective electrodes of said second set, and the device further including a potential source with positive and negative terminals and circuit means for coupling all the terminal pins of said first group to the said positive terminal and selectively coupling terminal pins of the second group to said negative terminal, whereby a glow discharge is established between selected electrodes of the second set, acting as cathodes, and electrodes of the first set acting as anodes.

5. A display device as claimed in claim 4, wherein the electrodes of the first set are substantially identical with those of the second set and like electrodes of the two sets are disposed adjacent one another.

6. A display device as claimed in claim 4, including switch means for reversing the coupling between said first and second groups of terminal pins and the terminals of said potential source whereby the electrodes of the second set become anodes and the electrodes of the first set can be selectively biased as cathodes.

7. A display device including a glow-discharge tube, the tube comprising a gas-filled envelope, two similar sets of electrodes so mounted within the envelope that each electrode of one set has a like electrode of the other set adjacent to it, and a separate terminal pin for each electrode of the two sets sealed through the envelope, and the device further including a potential source with positive and negative terminals, means for connecting the terminal pins of either set of electrodes at will to the positive terminal of the potential source and means for selectively connecting the terminal pins of the electrodes of the other set to the negative terminal to initiate a glow discharge between a selected cathode and an adjacent anode of like shape.

8. A glow discharge tube comprising a gas-filled envelope, two interleaved sets of display electrodes mounted within the envelope, the electrodes of one set being substantially identical with those of the other and each electrode of said one set being arranged adjacent the corresponding substantially identical electrode of the other set, and a separate terminal pin connected to each of the electrodes of the two sets and sealed through the envelope.

9. A tube as claimed in claim 8, in which the envelope is cylindrical and the electrodes are arranged in planes parallel to the longitudinal axis of the cylinder.

10. A glow discharge tube comprising a gas-filled envelope having a transparent viewing wall, a plurality of pairs of adjacent display electrodes, said electrodes each having a generally thin planar configuration, means for supporting said electrodes in said envelope with their planes parallel to each other and facing said transparent envelope wall, the electrodes of each pair being like display characters and being different characters than the characters of other pairs, all portions of one character of a pair being generally uniformly spaced from the corresponding like portions of the other character of the same pair, and each said pair of electrodes having terminal means for applying a potential difference between the electrodes thereof to effect a glow discharge at the surface of one of the latter electrodes.

11. A glow discharge device according to claim 10, wherein one set of electrodes is constituted by one electrode of each pair and the other electrodes constitute a second set, and further including circuit means connected to said terminal means for selectively applying to any electrode of one set a potential which is negative with respect to both the other electrode of the respective pair and to at least one other electrode of said last-mentioned set.

12. A glow discharge device according to claim 10, wherein one set of electrodes is constituted by one electrode of each pair and the other electrodes constitute a second set, the electrodes of said one set alternating in stacked relationship with the electrodes of the second set.

References Cited in the file of this patent

UNITED STATES PATENTS

| | | |
|---|---|---|
| 2,142,106 | Boswau | Jan. 3, 1939 |
| 2,618,760 | Hancock et al. | Nov. 18, 1952 |
| 2,756,366 | Maynard | July 24, 1956 |
| 2,769,939 | Williams | Nov. 6, 1956 |
| 2,874,320 | Hampel | Feb. 17, 1959 |
| 2,878,407 | Engleman et al. | Mar. 17, 1959 |
| 2,898,500 | Landrey | Aug. 4, 1959 |
| 2,906,906 | McCauley et al. | Sept. 29, 1959 |

UNITED STATES PATENT OFFICE
CERTIFICATE OF CORRECTION

Patent No. 2,991,388                          July 4, 1961

Colin J. Wightman

It is hereby certified that error appears in the above numbered patent requiring correction and that the said Letters Patent should read as corrected below.

In the grant, lines 2 and 12, and in the heading to the printed specification, line 5, name of assignee, for "Ericsson Telephone Limited", each occurrence, read -- Ericsson Telephones Limited --.

Signed and sealed this 2nd day of January 1962.

(SEAL)
Attest:

ERNEST W. SWIDER
Attesting Officer

DAVID L. LADD
Commissioner of Patents
USCOMM-DC